United States Patent
Kim

(10) Patent No.: US 7,593,301 B2
(45) Date of Patent: Sep. 22, 2009

(54) RECORDING APPARATUS FOR GENERATING WRITE PULSE CONTROL SIGNALS SUITABLE FOR VARIOUS TYPES OF OPTICAL RECORDING MEDIA

(75) Inventor: Sang-woo Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 636 days.

(21) Appl. No.: 11/301,847

(22) Filed: Dec. 13, 2005

(65) Prior Publication Data
US 2006/0133240 A1 Jun. 22, 2006

(30) Foreign Application Priority Data
Dec. 14, 2004 (KR) ............ 10-2004-0105575

(51) Int. Cl.
*G11B 7/0045* (2006.01)
(52) U.S. Cl. .................................. 369/59.11
(58) Field of Classification Search ............... None
See application file for complete search history.

(56) References Cited
U.S. PATENT DOCUMENTS

| 6,535,470 | B1 * | 3/2003 | Wu ................... 369/53.3 |
| 2002/0009034 | A1 | 1/2002 | Yamaguchi et al. ... 369/53.26 |
| 2003/0151995 | A1 * | 8/2003 | Asada et al. ........... 369/53.2 |
| 2003/0227850 | A1 | 12/2003 | Kato et al. ............ 369/59.11 |
| 2004/0136306 | A1 * | 7/2004 | Chao .................... 369/59.11 |
| 2006/0013086 | A1 * | 1/2006 | Wu et al. .............. 369/47.5 |

FOREIGN PATENT DOCUMENTS

KR 1020030069540 8/2003

OTHER PUBLICATIONS

Office Action dated Feb. 24, 2009 issued in corresponding Taiwanese Application No. TW094143829.

* cited by examiner

*Primary Examiner*—Joseph H Feild
*Assistant Examiner*—Christopher R Lamb
(74) *Attorney, Agent, or Firm*—Mills & Onello LLP

(57) ABSTRACT

A recording apparatus for generating write pulse control signals suitable for various optical recording media includes a pattern detector receiving a non return to zero inverted (NRZI) signal and distinguishing between information about a mark and information about a space, a memory storing timing parameters for a start pulse, a middle pulse, an ending pulse, and a cooling pulse of the write pulses corresponding to each of the various recording media using an activation table or in an index remapping method, a parameter fetcher fetching suitable timing parameters from the memory in response to a result of the distinguishing by the pattern detector, and a write pulse generator generating the write pulses based on the timing parameters received from the parameter fetcher and information stored in a register.

24 Claims, 9 Drawing Sheets

US 7,593,301 B2

RECORDING APPARATUS FOR GENERATING WRITE PULSE CONTROL SIGNALS SUITABLE FOR VARIOUS TYPES OF OPTICAL RECORDING MEDIA

CROSS-REFERENCE TO RELATED PATENT APPLICATIONS

This application claims the benefit of Korean Patent Application No. 10-2004-0105575, filed on Dec. 14, 2004, in the Korean Intellectual Property Office, the disclosure of which is incorporated herein in its entirety by reference.

BACKGROUND OF THE INVENTION

1. Field of the Invention

The present invention relates to an optical recording apparatus and an optical recording method, and more particularly, to a recording apparatus that generates write pulse control signals suitable for various optical recording media.

2. Description of the Related Art

With the advent and continuous development of multimedia, the demand for high-capacity recording media continues to increase. Examples of high-capacity recording media include a digital versatile disk-random access memory (DVD-RAM), DVD+R, DVD+RW, high-definition DVD (HD-DVD), blue-ray disc (BD), CD-R, compact disc-RW (CD-RW), and the like.

An optical disk recording apparatus that can read/write information from/to a variety of different types of optical media, such as, DVD-RAM, DVD-R, DVD-RW, DVD+RW, and CD-RW, is the most ideal. However, due to a difference between recording characteristics of optical recording apparatuses, write pulses for the various media can be different, depending on the type of recording medium.

FIG. 1 illustrates a writing strategy for an optical recording apparatus. Referring to FIG. 1, eight-to-fourteen modulation (EFM) data has a non return to zero inverted (NRZI) waveform. A laser power on/off signal LD_Power is a combination of a write signal WRITE, an overdrive signal OVERDRIVE, and a pre-heat signal PRE-HEAT. A write pulse control signal generator receives the EFM data to generate write control signals WEN2, WEN3, and WEN4, such as, the write signal WRITE, the overdrive signal OVERDRIVE, and the pre-heat signal PRE-HEAT, respectively. The write control signals WEN2, WEN3, and WEN4 generated by the write pulse control signal generator are provided to a laser diode driver. The laser diode driver drives a laser diode using the laser power on/off signal LD_Power and generates a laser emission required to write data to a disc.

FIGS. 2 through 4 illustrate other writing strategies. Referring to FIGS. 2 through 4, each of the write control signals WEN2, WEN3, and WEN4 is generated in various waveforms to generate a laser power on/off signal LD_Power used to write EFM data with an NRZI waveform to a disc.

Existing writing strategy modules for implementing these writing strategies are fixed in hardware. Existing optical disc recording apparatus using these writing strategy modules can only support writing strategies set upon the manufacture of the writing modules. Hence, existing optical disc writing apparatus are incompatible with newly developed high-speed media that use existing formats but require a new writing strategy or to-be-developed media that use a new format and also require a new writing strategy.

SUMMARY OF THE INVENTION

The present invention provides a recording apparatus that generates write pulse control signals suitable for various optical recording media. The recording apparatus of the present invention is compatible with newly developed high-speed media that use existing formats but require a new writing strategy or to-be-developed media that use a new format and also require a new writing strategy.

According to an aspect of the present invention, there is provided a recording apparatus for generating write pulses suitable for various optical recording media, the recording apparatus comprising: a pattern detector receiving a non return to zero inverted (NRZI) signal and distinguishing between information about a mark and information about a space; a memory storing timing parameters for a start pulse, a middle pulse, an ending pulse, and a cooling pulse of the write pulses corresponding to each of the various recording media; a register accessed as an activation table that determines whether a laser signal is to be turned on/off at time points set by the timing parameters; a parameter fetcher fetching suitable timing parameters from the memory in response to a result of the distinguishing by the pattern detector; and a write pulse generator generating the write pulses based on the timing parameters received from the parameter fetcher and information stored in the register.

In one embodiment, the timing parameters comprise parameters ts1, ts2, and ts3, which correspond to start edges of the start pulse, parameter tms, which correspond to a start edge of the middle pulse, parameter tmw, which denotes a width of the middle pulse, parameter tmc, which denotes a number of edges of the middle pulse, parameters te1, te2, and te3, which correspond to start edges of the ending pulse, parameter tcs, which correspond to a start edge of the cooling pulse, parameter tcw, which denotes a width of the cooling pulse, and parameter tcc, which denotes the number of edges of the cooling pulse.

In another embodiment, the timing parameters are read out from addresses of marks and spaces of the NRZI signal that are set in the memory to affect formation of an output waveform of the laser signal.

In another embodiment, the information stored in the register indicates whether the write pulses respond to timing parameters depending on the type of an optical recording medium that are provided by the parameter fetcher.

In another embodiment, the information stored in the register is provided by a processor that controls the recording apparatus.

In another embodiment, each of the write pulses serves as a signal selected from the group consisting of a peak power control signal, a cooling power control signal, an eraser power control signal, a bias power control signal, an overdrive control signal, and a pre-heat control signal.

In another embodiment, the write pulses are provided to a laser diode driver connected to the recording apparatus.

According to another aspect of the present invention, there is provided a recording apparatus for generating write pulses suitable for various optical recording media, the recording apparatus comprising: a pattern detector receiving a non return to zero inverted (NRZI) signal and distinguishing between information about a mark and information about a space; a memory storing timing parameters for a start pulse, a middle pulse, an ending pulse, and a cooling pulse of the write pulses corresponding to each of the various optical recording media using an index remapping method based on lengths of a leading mark (LM), a leading space (LS), a mark (M), a trailing space (TS), and a trailing mark (TS) that are provided by the pattern detector; a parameter fetcher fetching timing parameters corresponding to an optical recording medium to which data is to be written from the memory in response to a result of the distinguishing by the pattern detector; and a write pulse generator generating the write pulses based on the timing parameters received from the parameter fetcher and information stored in a register.

In one embodiment, the timing parameters comprise parameters ts1, ts2, and ts3, which correspond to start edges of the start pulse, parameter tms, which correspond to a start edge of the middle pulse, parameter tmw, which denotes a width of the middle pulse, parameter tmc, which denotes a number of edges of the middle pulse, parameters te1, te2, and te3, which correspond to start edges of the ending pulse, parameter tcs, which correspond to a start edge of the cooling pulse, parameter tcw, which denotes a width of the cooling pulse, and parameter tcc, which denotes the number of edges of the cooling pulse.

In another embodiment, the timing parameters are allocated to at least one of addresses set in the memory.

In another embodiment, the memory stores at least two of the timing parameters that have similar characteristics in a single address.

In another embodiment, the index remapping method for memory addressing is set to $$xADR+xLM \times LM_{idx}+xLS \times LS_{idx}+xM \times M_{idx}+xTS \times TS_{idx}+xTM \times TM_{idx}$$

wherein xADR denotes base addresses of the timing parameters, and addressing is accomplished by multiplying xLM, xLS, xM, xTS, and xTM by variable indexing parameters $xLM_{idx}$, $xLS_{idx}$, $XM_{idx}$, $xTS_{idx}$, and $xTM_{idx}$, respectively, and adding a result of the multiplication to the base address xADR.

In another embodiment, the information stored in the register indicates whether the write pulses respond to timing parameters depending on the type of an optical recording medium that are provided by the parameter fetcher.

In another embodiment, the information stored in the register is provided by a processor that controls the recording apparatus.

According to another aspect, the present invention is directed to a recording apparatus for generating write pulses suitable for various optical recording media. The recording apparatus comprises: a pattern detector receiving a non return to zero inverted (NRZI) signal and distinguishing between information about a mark and information about a space; a memory storing timing parameters for a start pulse, a middle pulse, an ending pulse, and a cooling pulse of the write pulses corresponding to each of the various recording media in an index remapping method; a register accessed as an activation table that determines whether a laser signal is to be turned on/off at time points set by the timing parameters; a parameter fetcher fetching suitable timing parameters from the memory in response to a result of the distinguishing by the pattern detector; and a write pulse generator generating the write pulses based on the timing parameters received from the parameter fetcher and information stored in the register.

In one embodiment, the timing parameters comprise parameters ts1, ts2, and ts3, which correspond to start edges of the start pulse, parameter tms, which correspond to a start edge of the middle pulse, parameter tmw, which denotes a width of the middle pulse, parameter tmc, which denotes the number of edges of the middle pulse, parameters te1, te2, and te3, which correspond to start edges of the ending pulse, parameter tcs, which correspond to a start edge of the cooling pulse, parameter tcw, which denotes a width of the cooling pulse, and parameter tcc, which denotes the number of edges of the cooling pulse.

In another embodiment, the timing parameters are set for a period of a channel clock, for example, for each T/32 of the period of the channel clock. In another embodiment, the timing parameters are set to be disabled.

In another embodiment, the timing parameters are allocated to at least one of addresses set in the memory.

In another embodiment, memory stores at least two of the timing parameters that have similar characteristics in a single address.

In another embodiment, in the index remapping method, the timing parameters are stored in the memory based on lengths of a leading mark (LM), a leading space (LS), a mark (M), a trailing space (TS), and a trailing mark (TS) that are provided by the pattern detector.

In another embodiment, the index mapping method for memory addressing is set to $$xADR+xLM \times LM_{idx}+xLS \times LS_{idx}+xM \times M_{idx}+xTS \times TS_{idx}+xTM \times TM_{idx}$$

wherein xADR denotes base addresses of the timing parameters, and addressing is accomplished by multiplying xLM, xLS, xM, xTS, and xTM by variable indexing parameters $xLM_{idx}$, $xLS_{idx}$, $xM_{idx}$, $xTS_{idx}$, and $xTM_{idx}$, respectively, and adding a result of the multiplication to the base address xADR.

In another embodiment, the information stored in the register indicates whether the write pulses respond to timing parameters depending on the type of an optical recording medium that are provided by the parameter fetcher.

In another embodiment, the information stored in the register is provided by a processor that controls the recording apparatus.

In another embodiment, each of the write pulses serves as a signal selected from the group consisting of a peak power control signal, a cooling power control signal, an eraser power control signal, a bias power control signal, an overdrive control signal, and a pre-heat control signal.

In another embodiment, the write pulses are provided to a laser diode driver connected to the recording apparatus.

Accordingly, a recording apparatus according to the present invention generates write pulses that are suitable for various optical recording media by using timing set values for controlling points in time when write pulses change, the timing set values being stored in a memory, and information indicating how the write pulses react with timing parameters stored in a register. Thus, the recording apparatus performs various writing strategies that are flexible to newly developed recording media or high-speed media as well as existing optical recording media.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Like numbers refer to like elements throughout the specification.

Figure 1:
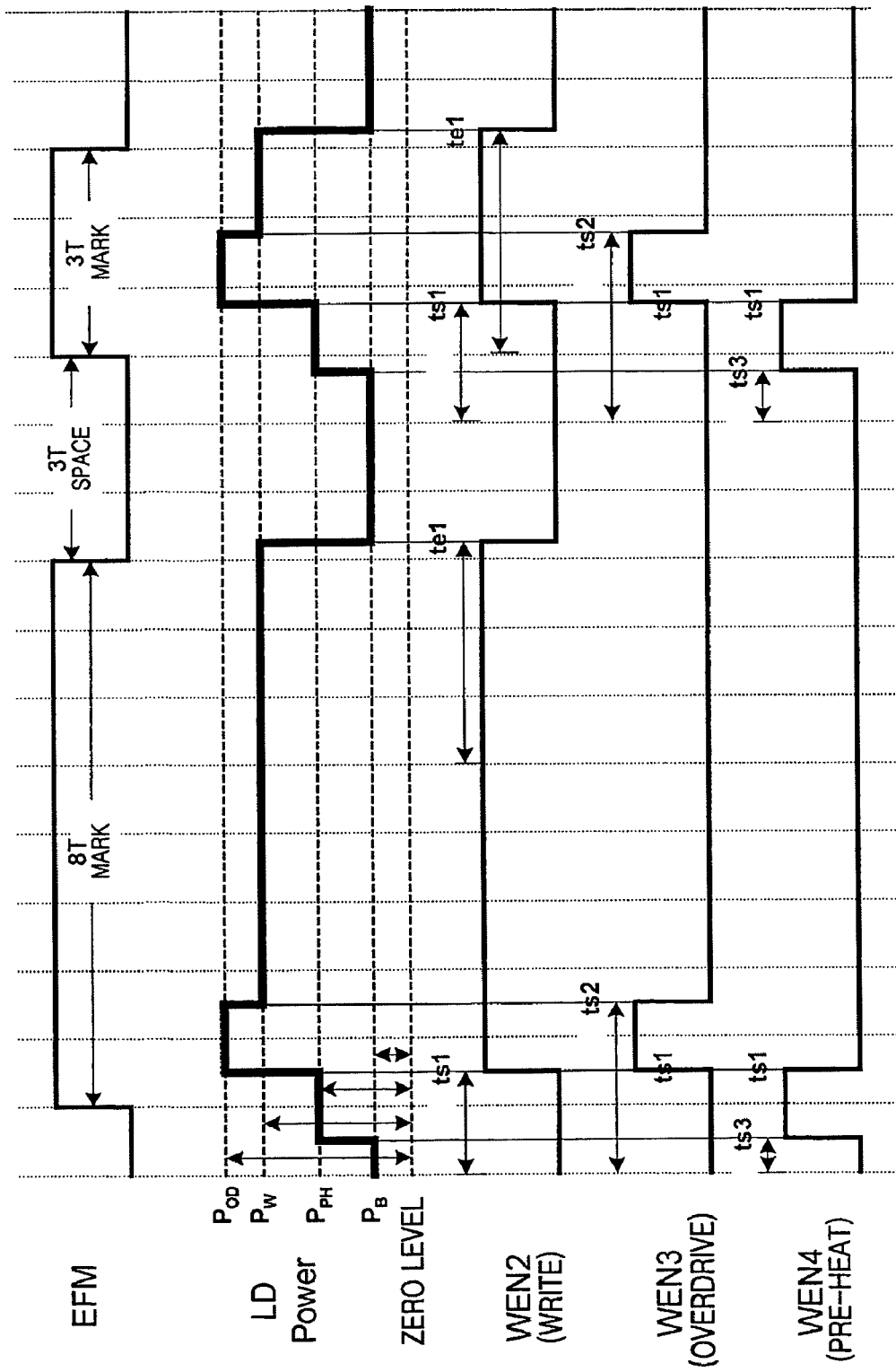
FIGS. 1 through 4 are waveform diagrams that illustrate various strategies of writing data to optical recording media.
Figure 2:
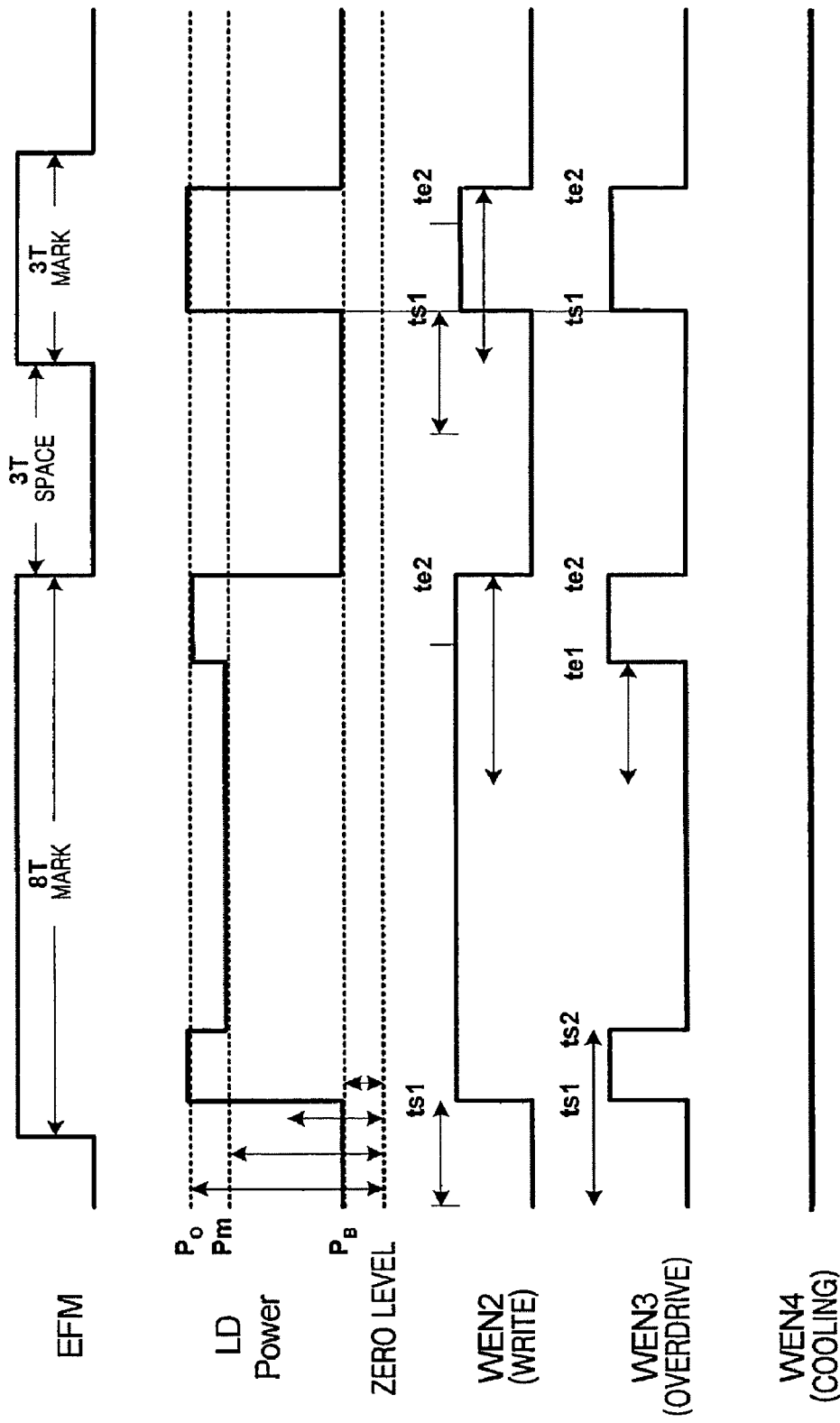
Figure 3:
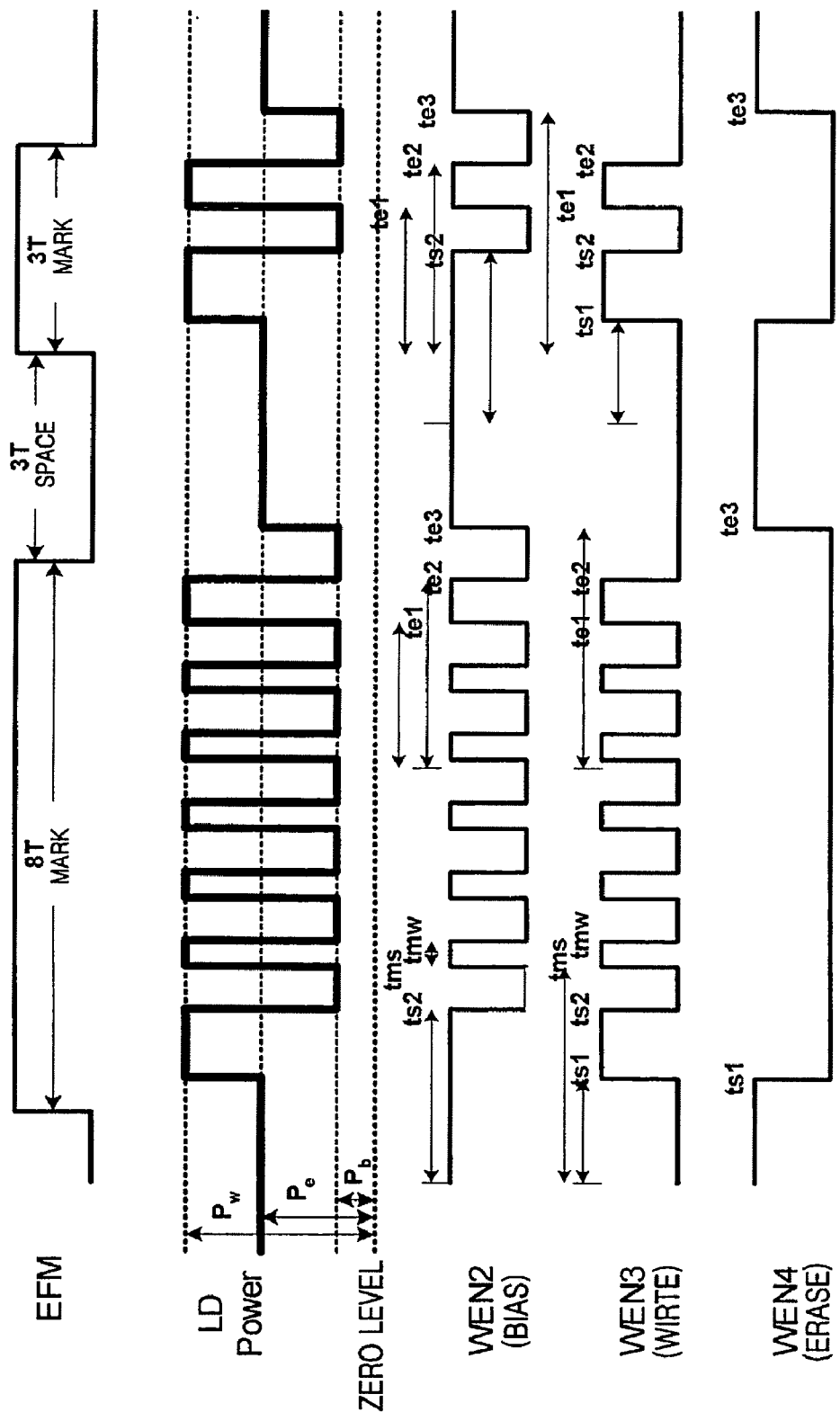
Figure 4:
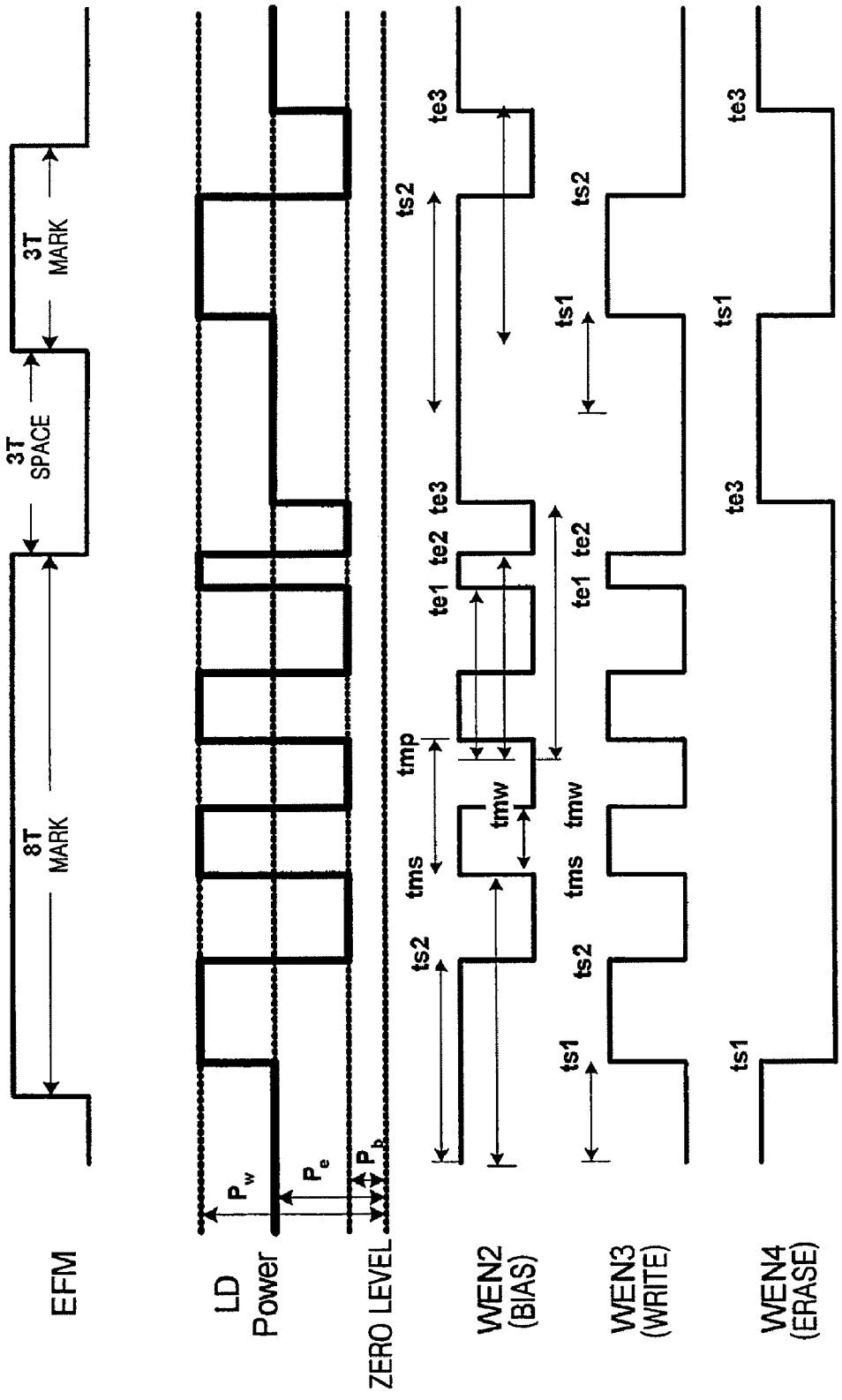
Figure 5:
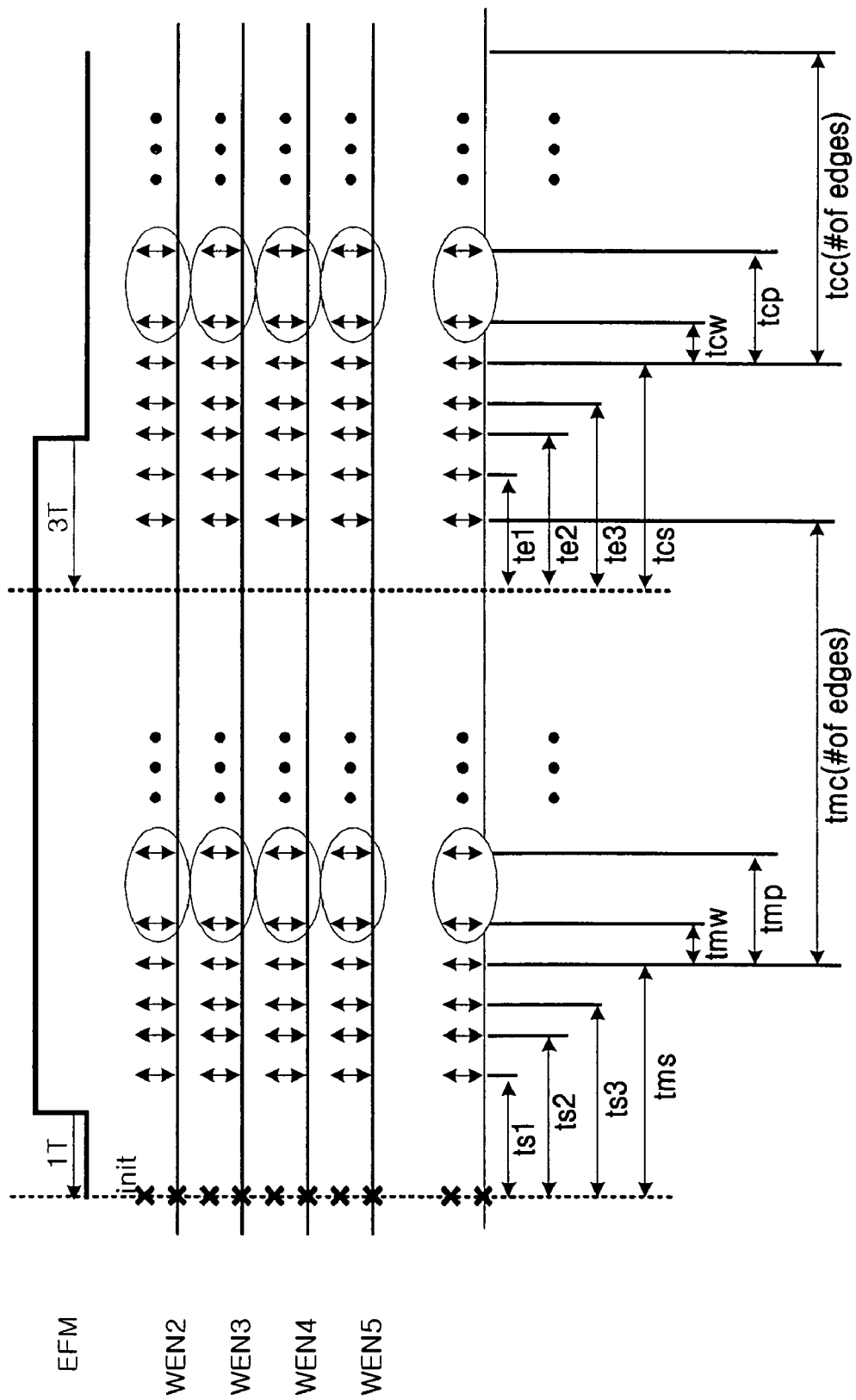
FIG. 5 is a waveform diagram that illustrates a dynamic writing strategy according to an embodiment of the present invention.

FIG. 5 illustrates a dynamic writing strategy according to an embodiment of the present invention. Referring to FIG. 5, timing parameters ts1, ts2, ts3, tms, tmw, tmp, te1, te2, te3, tcs, tcw, and tcp are defined to generate write pulses WEN2, WEN3, WEN4, and WEN5 based on an EFM signal having a non return to zero inverted (NRZI) waveform. At the times when the timing parameters ts1, ts2, ts3, tms, tmw, tmp, te1, te2, te3, tcs, tcw, and tcp are completely set, it is determined whether states of the write pulses WEN2, WEN3, WEN4, and WEN5 are to be inverted or retained. The timing parameters ts1, ts2, ts3, tms, tmw, tmp, te1, te2, te3, tcs, tcw, and tcp are set, for example, using an activation table as shown in Table 1.

parameters tms, tmw, and tmp, and the cooling pulse is determined by the timing parameters tcs, tcw, and tcp.

To write a mark having a short period and a mark having a long period, some writing strategies use pulses of different shapes. For example, in a writing strategy using a laser power on/off signal with a middle pulse, a mark having a short period, such as, 3T or 4T, may be written using a pulse having a different shape from a pulse used to write a mark having a long period, such as, 5T or greater. In this case, the laser power on/off signal uses timing parameters depending on the length of a mark, that is, uses different activation tables. One of the two activation tables is selected by a set register according to the length of a current mark to be written. Write pulses are generated using the timing parameters of the selected activation table.

Periods of a middle pulse and a cooling pulse are specified in tmp and tcp registers, respectively. Timing parameter tms indicates a first edge of a middle pulse, and timing parameter tmw indicates a second edge of the middle pulse. A third edge of the middle pulse is produced after the lapse of a period of tmp from a period of tms. Reference character tmc indicates the number of edges of the middle pulse in a mark/space period. The numbers of edges of the middle pulse in all mark/space periods are set. Similarly, timing parameter tcs indicates a first edge of a cooling pulse, and timing parameter tcw indicates a second edge of the cooling pulse. A third edge of the cooling pulse is produced after the lapse of a period of tcp from a period of tcs.

Figure 6:
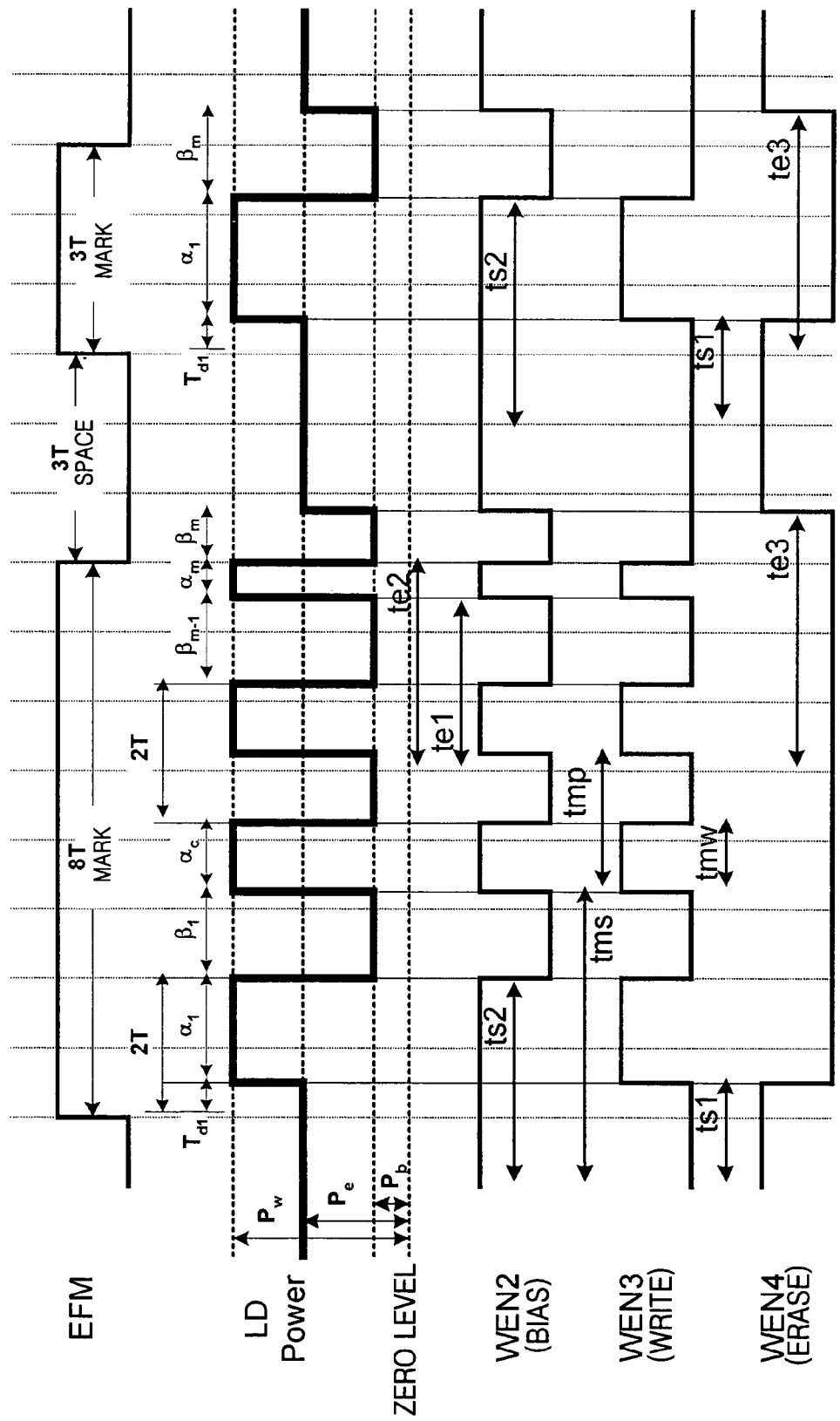
FIG. 6 is a waveform diagram that shows an example of write pulses generated in accordance with the dynamic writing strategy of FIG. 5.

When describing the writing strategy shown in FIG. 6 with reference to Table 1, the write pulse WEN2 is set in response

TABLE 1

| Address | Name | Bit 7 | Bit 6 | Bit 5 | Bit 4 | Bit 3 | Bit 2 | Bit 1 | Bit 0 |
|---|---|---|---|---|---|---|---|---|---|
| 10h | WSEFM2ACT | en | iact_val | inv | — | ts1 | ts2 | ts3 | tmc |
| 11h | | tmw | tmc | te1 | te2 | te3 | tcs | tcw | tcc |
| 12h | WSEFM3ACT | en | iact_val | inv | — | ts1 | ts2 | ts3 | tmc |
| 13h | | tmw | tmc | te1 | te2 | te3 | tcs | tcw | tcc |
| 14h | WSEFM4ACT | en | iact_val | inv | — | ts1 | ts2 | ts3 | tmc |
| 15h | | tmw | tmc | te1 | te2 | te3 | tcs | tcw | tcc |
| 16h | WSEFM5ACT | en | iact_val | inv | — | ts1 | ts2 | ts3 | tmc |
| 17h | | tmw | tmc | te1 | te2 | te3 | tcs | tcw | tcc |

Timing parameters en, iact_val, inv, ts1, ts2, ts3, tmc, tmw, tmc, te1, te2, te3, tcs, tcw, and tcc each set by a corresponding bit are used in WSEFM2ACT to generate the write pulse WEN2. Timing parameters en, iact_val, inv, ts1, ts2, ts3, tmc, tmw, tmc, te1, te2, te3, tcs, tcw, and tcc each set in by corresponding bit are used in WSEFM3ACT, WSEFM4ACT, and WSEFM5ACT to generate the write pulses WEN3, WEN4, and WEN5, respectively.

Depending on the type of strategy of writing data to an optical recording medium, each of the write pulses WEN2, WEN3, WEN4, and WEN5 operates as one of a peak power control signal, a cooling power control signal, an eraser power control signal, a bias power control signal, an overdrive control signal, and a pre-heat control signal as shown in FIGS. 1 through 4 above. The write pulses WEN2, WEN3, WEN4, and WEN5 form a start pulse, an ending pulse, a middle pulse, and a cooling pulse of a laser power on/off signal. The start pulse is determined by the timing parameters ts1, ts2, and ts3, the ending pulse is determined by the timing parameters te1, te2, and te3, the middle pulse is determined by the timing parameters tms, tmw, tmp, te1, and te2, and the write pulse WEN4 is set to respond to the timing parameters ts1 and te3.

The timing parameters ts1, ts2, ts3, tms, tmw, tmp, te1, te2, te3, tcs, tcw, and tcp shown in Table 1 and FIG. 5 are read out from a memory according to a dynamic write strategy setting and used to generate the write pulses WEN2, WEN3, WEN4, and WEN5. in a dynamic write strategy, timing parameters that vary slightly according to a mark/space are used to apply laser power on/off signals having different waveforms for different recording media. For example, if a length of a leading space is small, a current mark is written to a disc that has been heated but not yet cooled off. Hence, a start pulse of the current mark is generated slightly later so that the current mark can be controlled so as not to be too long. To accomplish the dynamic writing strategy, timing parameters are adjusted according to a length of a current mark and lengths of a space and a mark that are adjacent to the current mark. In other words, the influence of a leading space or a trailing mark upon a current mark or space to be written is programmed.

Figure 7:
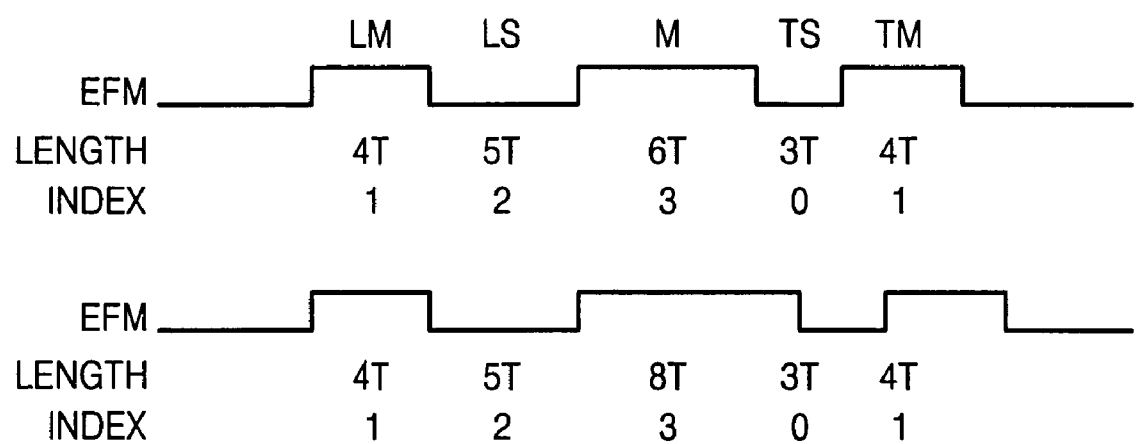
FIG. 7 is a waveform diagram that illustrates a memory indexing method for a writing strategy according to an embodiment of the present invention.

With reference to FIG. 7, a length of an input EFM signal is measured, stored in units of a group of lengths of a leading mark, a leading space (LM), a leading space (LS), a mark (M), a trailing space (TS), and a trailing mark (TM), and then analyzed. To obtain addresses for the timing parameters from the stored lengths of the LM, LS, M, TS, and TM, index remapping is performed. In the index re-mapping, a total of 10 lengths, which are 3T through 11T and 14T, are not individually indexed, but rather, the lengths of the LM, LS, M, TS, and TM length parameters are indexed as an index combination. Since the LM, LS, M, TS, and TM parameters affect the formation of a mark/space to be written with different characteristics, index remapping settings for the mark and space are controlled differently.

For example, in a 2T writing strategy, 6T and 8T marks/spaces can share timing parameters because they are sufficiently long and have similar characteristics. In FIG. 7, a mark M of 6T and a mark M of 8T are identically indexed so that they can share timing parameters ts1, ts2, . . . , and tcp. Addresses of the timing parameters stored in memory are determined according to Equation 1:

$$xADR + xLM \times LM_{idx} + xLS \times LS_{idx} + xM \times M_{idx} + xTS \times TS_{idx} + xTM \times TM_{idx} \quad (1)$$

wherein xLM, xLS, xM, xTS, and xTM are values set to appropriately index an activation table, and xADR denotes a base address of each of the timing parameters stored in memory.

For example, when timing parameters that determine the start pulse of the laser power on/off signal, such as, Ts1, Ts2, etc., are adjusted according to lengths of a mark, a leading space, and a leading mark, and lengths of each of the mark, the leading space, and the leading mark are divided into 5, a total of 125 (5*5*5) combinations can be addressed by setting xLM to 25, xLS to 5, xM to 1, and xTS and xTM to zero. In other words, addressing that is affected by LM, LS, and M is as shown in Table 2.

TABLE 2

| LM(LM$_{idx}$) | LS(LS$_{idx}$) | M(M$_{idx}$) |
| --- | --- | --- |
| 3(0) | 3(0) | 3(0) |
| 4(1) | 4(1) | 4(1) |
| 5(2) | 5(2) | 5(2) |
| 6(3) | 6(3) | 6(3) |
| 7-14(4) | 7-14(4) | 7-14(4) |

When timing parameters te1 and te2 for 40 combinations of 8 groups of marks and 5 groups of TS are intended to be adjusted, the 40 combinations can be addressed by setting xLM, xLS, and xTM to 0, xM to 1, and xTS to 8. In other words, addressing that is affected by M and TS is as shown in Table 3.

TABLE 3

| M(M$_{idx}$) | TS(TS$_{idx}$) |
| --- | --- |
| 3(0) | 3(0) |
| 4(1) | 4(1) |
| 5(2) | 5(2) |
| 6(3) | 6(3) |
| 7(4) | 7-14(4) |
| 8.10(5) | — |
| 9.11(6) | — |
| 14(7) | — |

Figure 8:
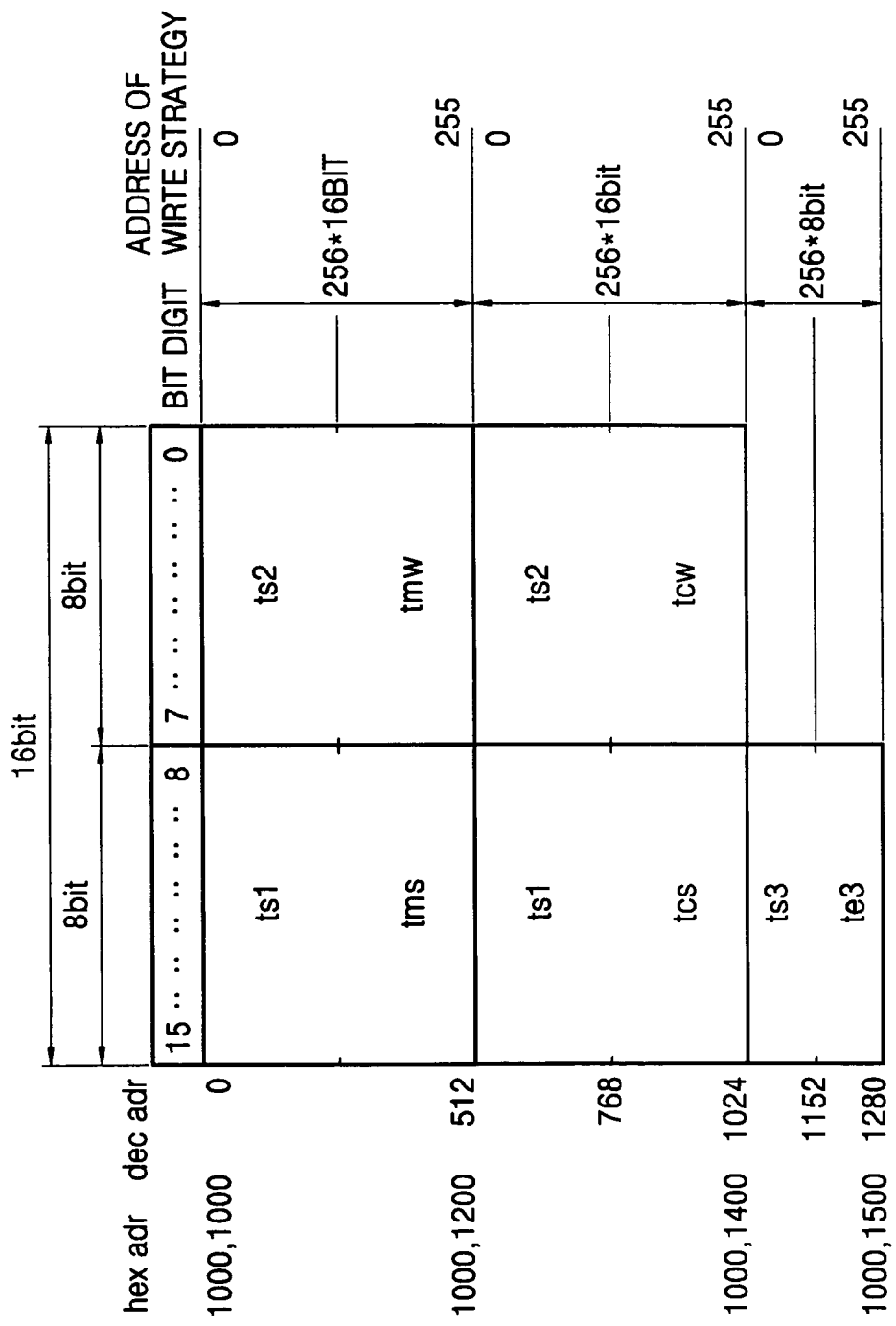
FIG. 8 illustrates a memory addressing method according to an embodiment of the present invention.

The timing parameters ts1, ts2, ts3, tms, tmw, tmp, te1, te2, te3, tcs, tcw, and tcp are read from the memory during a minimum mark-space period. In cases of CD/DVDs, the minimum mark-space period is a time corresponding to 6T. However, as writing speed increases, 6T is not a long enough time period to access a memory that stores timing parameters. Accordingly, as shown in FIG. 8, a pair of ts1 and ts2, a pair of tms and tmw, a pair of te1 and te2, and a pair of tcs and tcw, each pair having similar writing strategy characteristics, are addressed in units of pairs, such that the number of accesses to the memory can be reduced.

Figure 9:
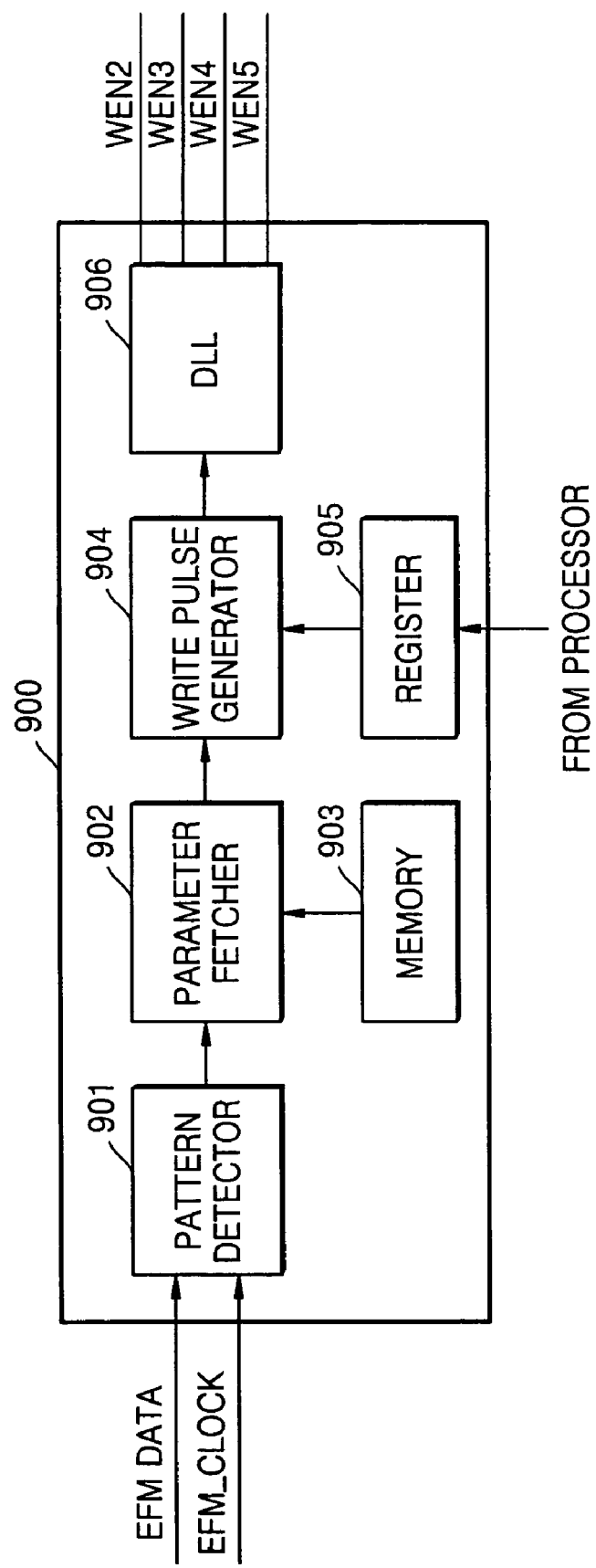
FIG. 9 is a block diagram of a write pulse generating apparatus according to an embodiment of the present invention.

FIG. 9 is a block diagram of a write pulse generating apparatus 900 according to an embodiment of the present invention. The write pulse generating apparatus 900 analyzes a received EFM signal to generate write pulses WEN2, WEN3, WEN4, and WEN5 suitable for various optical recording media. In the write pulse generating apparatus 900, a pattern detector 901 receives the EFM signal, which has a non return to zero inverted (NRZI) waveform, distinguishes between a leading mark LM, a leading space LS, a mark M, a trailing space TS, and a trailing mark TM, and provides a result of the distinguishing to a parameter fetcher 902.

The parameter fetcher 902 fetches from a memory 903 timing parameters ts1, ts2, ts3, tms, tmw, tmp, te1, te2, te3, tcs, tcw, and tcp corresponding to a recording medium of interest from activation tables (as shown in Table 1) for timing parameters ts1, ts2, ts3, tms, tmw, tmp, te1, te2, te3, tcs, tcw, and tcp. In one example, the memory 903 comprises an SRAM; however, other types of memory are equally applicable to the present invention. A write pulse generator 904 generates the write pulses WEN2, WEN3, WEN4, and WEN5 based on the timing parameters ts1, ts2, ts3, tms, tmw, tmp, te1, te2, te3, tcs, tcw, and tcp received from the parameter fetcher 902 and information stored in a register 905. The register 905 stores information about the types of recording media and provides the write pulse generator 904 with information about whether the write pulses WEN2, WEN3, WEN4, and WEN5 respond to the timing parameters ts1, ts2, ts3, tms, tmw, tmp, te1, te2, te3, tcs, tcw, and tcp received from the parameter fetcher 902. A delay locked loop (DLL) 906 adjusts transit information for each EFM clock signal EFM_CLOCK in units corresponding to $\frac{1}{32}$ of a clock cycle of the EFM clock signal to produce the write pulses WEN2, WEN3, WEN4, and WEN5. The write pulses WEN2, WEN3, WEN4, and WEN5 are provided to a laser diode driver (not shown) and generated as a laser power on/off signal.

While the present invention has been particularly shown and described with reference to exemplary embodiments thereof, it will be understood by those of ordinary skill in the art that various changes in form and details may be made herein without departing from the spirit and scope of the present invention as defined by the following claims.

What is claimed is:

1. A recording apparatus for generating write pulses suitable for various optical recording media, the recording apparatus comprising:

a pattern detector receiving a non return to zero inverted (NRZI) signal and distinguishing between information about a mark and information about a space;

a memory storing timing parameters for a start pulse, a middle pulse, an ending pulse, and a cooling pulse of the write pulses corresponding to each of the various recording media;

a register accessed as an activation table that determines whether a laser signal is to be turned on/off at time points set by the timing parameters;

a parameter fetcher fetching suitable timing parameters from the memory in response to a result of the distinguishing by the pattern detector; and a write pulse generator generating the write pulses based on the timing parameters received from the parameter fetcher and information stored in the register, wherein the timing parameters comprise parameter ts1, which corresponds to a start edge of the start pulse, parameter ts2, which corresponds to a second edge of the start pulse, parameter ts3, which corresponds to a third edge of the start pulse, parameter tms, which corresponds to a start edge of the middle pulse, parameter tmw, which denotes a width of the middle pulse, parameter tmc, which denotes a number of edges of the middle pulse, parameter te1, which corresponds to a start edge of the ending pulse, parameter te2, which corresponds to a second edge of the ending pulse, parameter te3, which corresponds to third edge of the ending pulse, parameter tcs, which corresponds to a start edge of the cooling pulse, parameter tcw, which denotes a width of the cooling pulse, and parameter tcc, which denotes the number of edges of the cooling pulse.

2. The recording apparatus of claim 1, wherein the timing parameters are read out from addresses of marks and spaces of the NRZI signal that are set in the memory to affect formation of an output waveform of the laser signal.

3. The recording apparatus of claim 1, wherein the information stored in the register indicates whether the write pulses respond to timing parameters depending on the type of an optical recording medium that are provided by the parameter fetcher.

4. The recording apparatus of claim 3, wherein the information stored in the register is provided by a processor that controls the recording apparatus.

5. The recording apparatus of claim 1, wherein each of the write pulses serves as a signal selected from the group consisting of a peak power control signal, a cooling power control signal, an eraser power control signal, a bias power control signal, an overdrive control signal, and a pre-heat control signal.

6. The recording apparatus of claim 1, wherein the write pulses are provided to a laser diode driver connected to the recording apparatus.

7. A recording apparatus for generating write pulses suitable for various optical recording media, the recording apparatus comprising:

a pattern detector receiving a non return to zero inverted (NRZI) signal and distinguishing between information about a mark and information about a space;

a memory storing timing parameters for a start pulse, a middle pulse, an ending pulse, and a cooling pulse of the write pulses corresponding to each of the various optical recording media using an index remapping method based on lengths of a leading mark (LM), a leading space (LS), a mark (M), a trailing space (TS), and a trailing mark (TS) that are provided by the pattern detector;

a parameter fetcher fetching timing parameters corresponding to an optical recording medium to which data is to be written from the memory in response to a result of the distinguishing by the pattern detector; and a write pulse generator generating the write pulses based on the timing parameters received from the parameter fetcher and information stored in a register, wherein the timing parameters comprise parameter ts1, which corresponds to a start edge of the start pulse, parameter ts2, which corresponds to a second edge of the start pulse, parameter ts3, which corresponds to a third edge of the start pulse, parameter tms, which corresponds to a start edge of the middle pulse, parameter tmw, which denotes a width of the middle pulse, parameter tmc, which denotes a number of edges of the middle pulse, parameter te1, which corresponds to a start edge of the ending pulse, parameter ts2, which corresponds to a second edge of the ending pulse, parameter ts3, which corresponds to a third edge of the ending pulse, parameter tcs, which corresponds to a start edge of the cooling pulse, parameter tcw, which denotes a width of the cooling pulse, and parameter tcc, which denotes the number of edges of the cooling pulse.

8. The recording apparatus of claim 7, wherein the timing parameters are allocated to at least one of addresses set in the memory.

9. The recording apparatus of claim 7, wherein the memory stores at least two of the timing parameters that have similar characteristics in a single address.

10. The recording apparatus of claim 7, wherein the index remapping method determines addresses of the timing parameters stored in the memory according to $$xADR + xLM \times LM_{idx} + xLS \times LS_{idx} + xM \times M_{idx} + xTS \times TS_{idx} + xTM \times TM_{idx},$$

wherein xADR denotes a base address of an activation table that stores the timing parameters in the memory, xLM, xLS, xM, xTS, and xTM are base addresses of the LM, LS, M, TS, and TM in the activation table, respectively, and $xLM_{idx}$, $xLS_{idx}$, $xM_{idx}$, $xTS_{idx}$, and $xTM_{idx}$ are variable indexing parameters corresponding to the base addresses of the LM, LS, M, TS, and TM, respectively, and wherein addressing is accomplished by multiplying the base addresses xLM, xLS, xM, xTS, and xTM by the variable indexing parameters $xLM_{idx}$, $xLS_{idx}$, $xM_{idx}$, $xTS_{idx}$, and $xTM_{idx}$, respectively, and adding a result of the multiplication to the base address xADR.

11. The recording apparatus of claim 10, wherein the information stored in the register is provided by a processor that controls the recording apparatus.

12. The recording apparatus of claim 7, wherein the information stored in the register indicates whether the write pulses respond to timing parameters depending on the type of an optical recording medium that are provided by the parameter fetcher.

13. A recording apparatus for generating write pulses suitable for various optical recording media, the recording apparatus comprising:

a pattern detector receiving a non return to zero inverted (NRZI) signal and distinguishing between information about a mark and information about a space;

a memory storing timing parameters for a start pulse, a middle pulse, an ending pulse, and a cooling pulse of the write pulses corresponding to each of the various recording media in an index remapping method;

a register accessed as an activation table that determines whether a Laser signal is to be turned on/off at time points set by the timing parameters;

a parameter fetcher fetching suitable timing parameters from the memory in response to a result of the distinguishing by the pattern detector; and a write pulse generator generating the write pulses based on the timing parameters received from the parameter fetcher and information stored in the register, wherein the timing parameters comprise parameter ts1, which corresponds to a start edge of the start pulse, parameter ts2, which corresponds to a second edge of the start pulse, parameter ts3, which corresponds to a third edge of the start pulse, parameter tms, which corresponds to a start edge of the middle pulse, parameter tmw, which denotes a width of the middle pulse, parameter tmc, which denotes the number of edges of the middle pulse, parameter te1, which corresponds to a start edge of the ending pulse, parameter te2, which corresponds to a second edge of the ending pulse, parameter te3, which corresponds to a third edge of the ending pulse, parameter tcs, which corresponds to a start edge of the cooling pulse, parameter tcw, which denotes a width of the cooling pulse, and parameter tcc, which denotes the number of edges of the cooling pulse.

14. The recording apparatus of claim 13, wherein the timing parameters are set for a period of a channel clock.

15. The recording apparatus of claim 14, wherein the timing parameters are set for each T/32 of the period of the channel clock.

16. The recording apparatus of claim 14, wherein the timing parameters are set to be disabled.

17. The recording apparatus of claim 13, wherein the timing parameters are allocated to at least one of addresses set in the memory.

18. The recording apparatus of claim 13, wherein the memory stores at least two of the timing parameters that have similar characteristics in a single address.

19. The recording apparatus of claim 13, wherein in the index remapping method, the timing parameters are stored in the memory based on lengths of a leading mark (LM), a leading space (LS), a mark (M), a trailing space (TS), and a trailing mark (TS) that are provided by the pattern detector.

20. The recording apparatus of claim 19, wherein the index mapping method determines addresses of the timing parameters stored in the memory according to $$xADR + xLM \times xLM_{idx} + xLS \times xLS_{idx} + xM \times xM_{idx} + xTS \times xTS_{idx} + xTM \times xTM_{idx},$$

wherein xADR denotes a base address of an activation table that stores the timing parameters in the memory, xLM, xLS, xM, xTS, and xTM are base addresses of the LM, LS, M, TS, and TM in the activation table, respectively, and $xLM_{idx}$, $xLS_{idx}$, $xM_{idx}$, $xTS_{idx}$, and $xTM_{idx}$ are variable indexing parameters corresponding to the base addresses of the LM, LS, M, TS and TM, respectively, and wherein addressing is accomplished by multiplying the base addresses xLM, xLS, xM, xTS, and xTM by the variable indexing parameters $xLM_{idx}$, $xLS_{idx}$, $xM_{idx}$, $xTS_{idx}$, and $xTMd_{idx}$, respectively, and adding a result of the multiplication to the base address xADR.

21. The recording apparatus of claim 13, wherein the information stored in the register indicates whether the write pulses respond to timing parameters depending on the type of an optical recording medium that are provided by the parameter fetcher.

22. The recording apparatus of claim 21, wherein the information stored in the register is provided by a processor that controls the recording apparatus.

23. The recording apparatus of claim 13, wherein each of the write pulses serves as a signal selected from the group consisting of a peak power control signal, a cooling power control signal, an eraser power control signal, a bias power control signal, an overdrive control signal, and a pre-heat control signal.

24. The recording apparatus of claim 13, wherein the write pulses are provided to a laser diode driver connected to the recording apparatus.

* * * * *

UNITED STATES PATENT AND TRADEMARK OFFICE
CERTIFICATE OF CORRECTION

PATENT NO. : 7,593,301 B2
APPLICATION NO. : 11/301847
DATED : September 22, 2009
INVENTOR(S) : Sang-woo Kim It is certified that error appears in the above-identified patent and that said Letters Patent is hereby corrected as shown below:

Column 10, line 29 delete " $xTM_{idx}$ " and insert --$xTM_{idx}$--
Column 10, line 57 delete "Laser" and insert --laser--
Column 12, lines 1 and 2, replace the formula with the one listed below:

$$xADR + xLM \times LM_{idx} + xLS \times LS_{idx} + xM \times M_{idx} + xTS \times TS_{idx} + xTM \times TM_{idx}$$

Column 12, line 14 delete "xTMd$_{idx}$" and insert --xTM$_{idx}$--

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,593,301 B2
APPLICATION NO. : 11/301847
DATED : September 22, 2009
INVENTOR(S) : Sang-woo Kim Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Twenty-first Day of September, 2010

David J. Kappos
*Director of the United States Patent and Trademark Office*